United States Patent [19]

Lehe

[11] Patent Number: 5,351,458

[45] Date of Patent: Oct. 4, 1994

[54] SPACED-PLANK FLOOR SYSTEM FOR ANIMAL ENCLOSURES

[76] Inventor: Russell B. Lehe, 250 Parliament Pl., Mount Prospect, Ill. 60056

[21] Appl. No.: 954,899

[22] Filed: Sep. 30, 1992

[51] Int. Cl.$^5$ .............................................. E04B 5/00
[52] U.S. Cl. ................................. 52/586.2; 52/177; 119/28
[58] Field of Search ............... 52/177, 181, 579, 586, 52/588; 119/28

[56] References Cited

U.S. PATENT DOCUMENTS

| Re. 28,834 | 6/1976 | Johnson | 119/28 |
|---|---|---|---|
| 3,230,931 | 1/1966 | Taylor et al. | 119/28 |
| 3,680,530 | 8/1972 | Drawsky | 52/586 X |
| 3,716,027 | 2/1973 | Vickstrom et al. | 52/588 X |
| 3,721,215 | 3/1973 | Vickstrom et al. | 119/28 |
| 3,722,473 | 3/1973 | Vickstrom et al. | 119/28 |
| 3,722,474 | 3/1973 | Vickstrom et al. | 119/28 |
| 3,730,140 | 5/1973 | Bowser et al. | 119/28 |
| 3,742,911 | 7/1973 | Lehe et al. | 52/586 X |
| 3,757,743 | 9/1973 | Lehe et al. | 119/28 |
| 3,804,067 | 4/1974 | Lehe et al. | 119/28 |
| 3,837,319 | 9/1974 | Lehe | 52/586 x |
| 3,995,593 | 12/1976 | Bowser | 119/28 |

FOREIGN PATENT DOCUMENTS

| 8001-504 | 9/1980 | Netherlands | 119/28 |
|---|---|---|---|
| 486618 | 4/1970 | Switzerland | 52/177 |

Primary Examiner—Carl D. Friedman
Assistant Examiner—Kevin D. Wilkens
Attorney, Agent, or Firm—Palmatier & Zummer

[57] ABSTRACT

The floor system comprises spaced parallel horizontal planks, each including a metal inverted channel comprising a deck member having two spaced depending structural flanges and two laterally projecting edge channels thereon, each having a depending leg and an in-turned lower leg with a slot between each lower leg and the adjacent structural flange. U-shaped connectors extend between the planks and have upturned flanges with in-turned hook members received in the slots and interlocking with the edge channels. Soft rubber-like cylindrical stops are tightly fitted into the slots adjacent opposite ends of the connectors to prevent sliding movement thereof. Each inverted channel has a heat insulating resinous plastic cushioning cover with a top wall over the deck member, side walls enclosing the depending legs, and in-turned horizontal flanges clamped to the lower legs. Depending drip lips extend along the lower edges of the side walls of the cover. The top wall of the cover includes a soft resilient rubber-like cushioning tread member laminated to the top wall and having interspersed first and second mutually perpendicular traction ridges, each having an inverted V-shaped cross section and end portions tapering to points. The cover feels warm and soft to the animals. The ridges prevent the animals' feet from slipping.

11 Claims, 3 Drawing Sheets

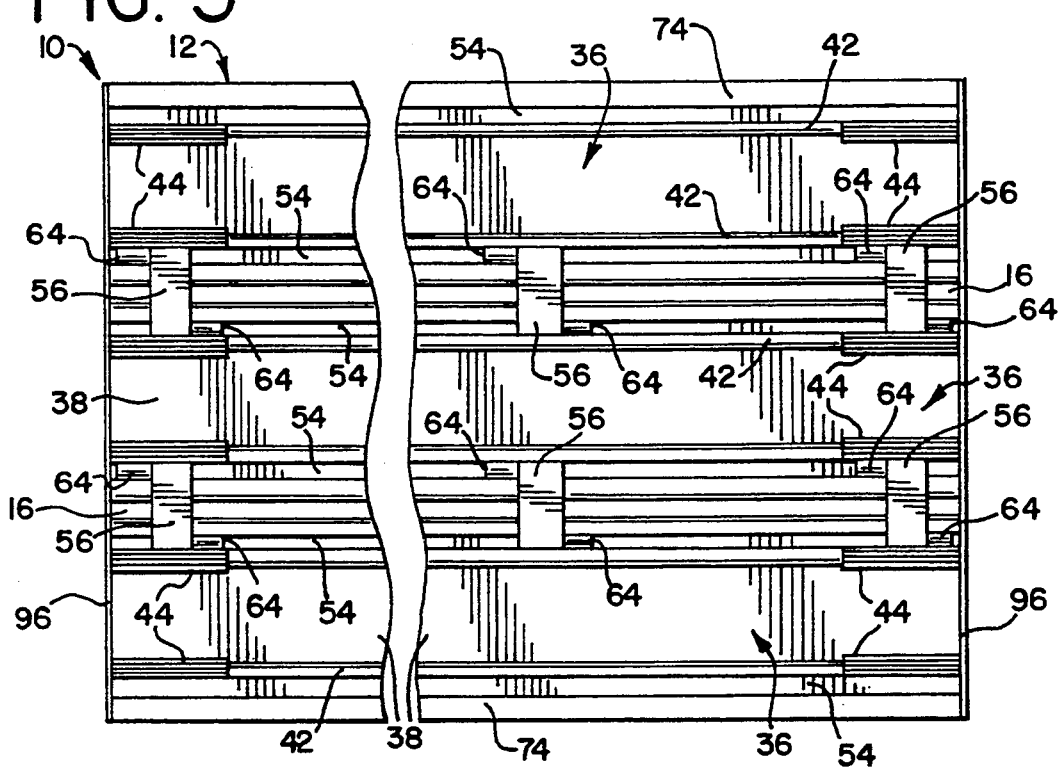
FIG. 5
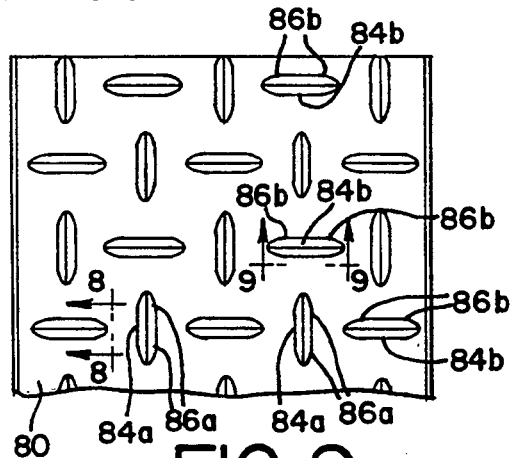
FIG. 6
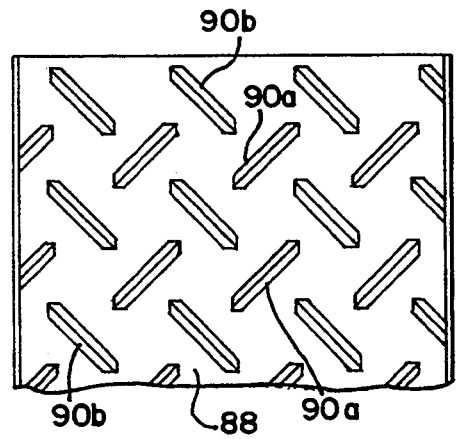
FIG. 7
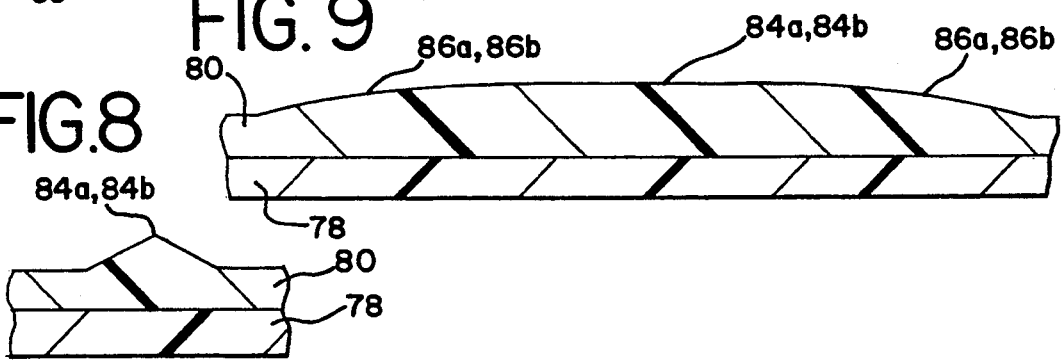
FIG. 8
FIG. 9

SPACED-PLANK FLOOR SYSTEM FOR ANIMAL ENCLOSURES

FIELD OF THE INVENTION

This invention relates to an improved spaced-plank floor system for animal enclosures in which domestic animals, such as pigs, for example, may be raised in confinement. Such floor systems are also sometimes referred to as slatted floor systems.

BACKGROUND OF THE INVENTION

In certain aspects, this invention may be regarded as an improvement upon the floor system disclosed and claimed in the applicant's U.S. Pat. No. 3,837,319, patented Sep. 24, 1974, and entitled SLATTED FLOOR SYSTEM. The floor system of such patent comprises an array of spaced planks in the form of metal inverted channels which are spaced apart by a multiplicity of generally channel-shaped connectors, extending between the planks at longitudinally spaced intervals. The connectors interlock with edge channels formed along the longitudinal edges of the planks. Each of the connectors is generally in the form of a U-shaped channel having a generally horizontal member with a pair of upturned flanges formed with in-turned hook members for slidable reception in edge channels on the planks. In addition to maintaining the desired spacing between the planks, the connectors are effective to transfer loading between the adjacent planks. Unless some special means are provided to maintain the connectors in their desired positions, spaced at intervals along the planks, the connectors tend to slide along the planks due to the shifting loads and the resulting deflections and vibration of the planks.

The planks disclosed in the applicant's patent, identified above, are made of a corrosion resistant metal, such as electrochemically coated or anodized aluminum or an anodized aluminum alloy. The metal material has the disadvantage that it feels cold to the animals, particularly when they lie down on the metal planks. Moreover, the metal planks tend to be slippery, particularly when wet or coated with animal wastes. The slippery conditions may sometimes cause the animals to fall or stumble, with the resulting possibility of injuries to the animals. The metal planks are also noisy, due to the footfalls of the animals on the planks.

Although the anodized aluminum or anodized aluminum alloy planks are resistant to corrosion, they are eventually subject to corrosion and deterioration due to the combined corrosive action of atmospheric oxygen, the animal wastes which are deposited on the planks, and the gases, such as amonia, evolved from such wastes. Of course, the spaced planks of the floor system are frequently washed to cause the animal wastes to flow through the slots or spaces between the planks, into a pit beneath the floor system. The pit is generally made of concrete and is provided with a flushing or pumping system whereby the animal wastes can be flushed out of the pit with an abundance of water. Even so, corrosion and deterioration of the metal planks can become a problem.

OBJECTS OF THE INVENTION

One object of the present invention is to provide a new and improved spaced-plank floor system of the foregoing character having improved means for effectively yet economically maintaining the connectors in their desired positions and for preventing any sliding movement of the connectors along the edge channels on the spaced planks.

Another object is to provide a new and improved spaced-plank floor system of the foregoing character having an improved cover member or cushion cap for covering the top and side walls of the metal inverted channels to eliminate substantially all corrosion problems while also reducing noise, providing comfort for the animals, and affording improved traction for the feet of the animals, to obviate or reduce the problem of slipperiness.

Another object is to provide an improved cover member which substantially prevents the animal wastes from coming into contact with the metal inverted channels.

SUMMARY OF THE INVENTION

To achieve these objects, the present invention provides a spaced-plank floor system comprising a plurality of spaced longitudinal planks extending horizontally in a parallel spaced relation, each of the planks including a metal inverted channel comprising a substantially horizontal deck member having a pair of depending structural flanges affording rigidity and resisting vertical bending of the plank. Each deck member has a pair of edge channels projecting laterally thereon beyond the respective depending flanges. Each of the edge channels has a depending leg extending downwardly from the deck member and a lower leg extending laterally inwardly from the depending leg toward the corresponding flange to afford a longitudinal slot therebetween. The floor system also comprises a plurality of generally channel-shaped connectors extending between the planks at longitudinally spaced intervals and interlocking with the edge channels on the inverted channels for maintaining a predetermining spacing between the planks and for transferring vertical loading between the adjacent planks. Each of the connectors is generally in the form of a U-shaped channel having a generally horizontal member with a pair of upturned flanges formed with in-turned hook members for slidable reception in the edge channels of the planks. The floor system also comprises a plurality of stop members made of a soft resilient rubber-like material. The stop members are substantially larger in cross-sectional width than the width of the longitudinal slots but are dimensioned to fit tightly into the slots adjacent the ends of the connectors when pushed into the slots during the assembly of the planks and connectors, whereby the stop members are effective to locate the connectors in spaced positions along the edge channels and the slots while substantially preventing sliding movement of the connectors therealong.

Preferably, each of the stop members is initially generally cylindrical in shape and is resiliently compressible to fit tightly in the slots adjacent the opposite ends of the connectors.

The stop members are preferably made of soft resilient synthetic rubber or a comparable rubber-like resinous plastic material.

In another aspect, the present invention provides a spaced-plank floor system comprising a plurality of spaced longitudinal planks extending horizontally in a parallel spaced relation. Each of the planks includes a metal inverted channel comprising a generally horizontal deck member having a pair of depending structural flanges affording rigidity and resisting vertical deflection of the plank. The deck member has a pair of edge channels projecting laterally thereon beyond the respective depending structural flanges. Each of the edge channels has a depending leg extending downwardly from the deck member and a lower leg extending laterally inwardly from the depending leg toward the corresponding flange to afford a longitudinal slot therebetween. Each of the planks also comprises a cover member made of a heat insulating liquid-proof material and covering the deck member. The cover member has a top wall for covering the upper surface of the deck member, while also having a pair of side walls depending from the top wall for enclosing the depending legs of the edge channels. Each of the side walls has a lower edge and a lower generally horizontal flange extending laterally inwardly from the lower edge for covering the corresponding lower leg on the corresponding edge channel of the inverted channel. Each of the lower legs has clamping means for clamping the corresponding lower flange of the cover member against the corresponding lower leg. Each of the lower edges of the side walls has a downwardly projecting longitudinal lip thereon for causing any liquid which flows down the side wall to drip downwardly from the lip rather than flowing around the lip to the corresponding lower flange.

The clamping means preferably comprise a pair of bendable alligator jaw flanges formed integrally with the lower legs of the edge channels for clamping the lower flanges of the cover member against the corresponding lower legs, whereby the cover member is securely mounted on the inverted channel.

The cover member is preferably made of flexible resilient resinous plastic materials which may comprise a polyurethane tread member securely laminated to a polyvinylchloride structural member.

In another aspect, the invention provides a spaced-plank floor system comprising a plurality of spaced parallel planks for supporting animals. Each of the planks comprising an inverted channel made of metal and having a substantially horizontal deck member with a pair of spaced structural flanges projecting downwardly therefrom. The floor system also comprises a plurality of connectors extending between the adjacent planks for maintaining predetermined spacing between the planks. The connectors and the planks have means for transferring loads between the adjacent planks. Each of the deck members has an upper surface and a tread member covering the upper surface and securely mounted on the corresponding inverted channel. Each tread member has a soft resilient rubber-like upper load-supporting portion with upwardly projecting tread means thereon. The tread means comprise a plurality of interspersed first and second upwardly projecting ridge elements thereon. The first ridge elements extend in a predetermined direction while the second ridge elements extend in a second direction substantially perpendicular to the first direction. Each of the ridge elements has a cross section substantially in the form of an inverted V. Each of the ridge elements also has end portions tapering in width to form a point and also tapering in height. The ridge elements afford secure traction for the feet of animals supported on the tread members.

The ridge elements preferably have a length and a spacing therebetween corresponding generally with the size of the feet of the smallest animals to be supported on the floor system.

The tread member of each plank may constitute a component of the previously mentioned cover member.

BRIEF DESCRIPTION OF THE DRAWINGS

Further objects, advantages and features of the present invention will appear from the following description, taken with the accompanying drawings, in which:

FIG. 5 is a fragmentary bottom plan view of the floor system.

FIG. 6 is a fragmentary plan view of one of the planks showing details of the tread structure.

FIG. 7 is a fragmentary plan view, similar to FIG. 6, but showing a modified tread construction.

FIG. 8 is a fragmentary enlarged vertical section, taken generally along the line 8—8 in FIG. 6, to show the cross-sectional shape of one of the tread ridges.

FIG. 9 is a fragmentary vertical section, taken generally along the line 9—9 in FIG. 6, to show a longitudinal section of one of the tread ridges.

DETAILED DESCRIPTION OF AN ILLUSTRATIVE EMBODIMENT

Figure 1:
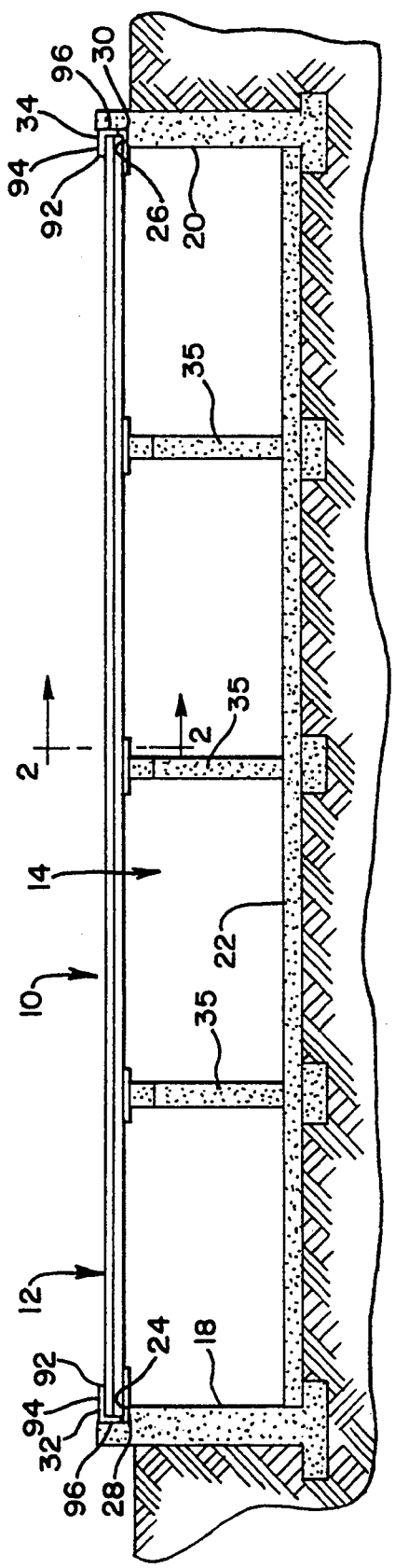
FIG. 1 is a side elevational view, partly in vertical section, of a spaced-plank floor system to be described as an illustrative embodiment of the present invention.
Figure 2:
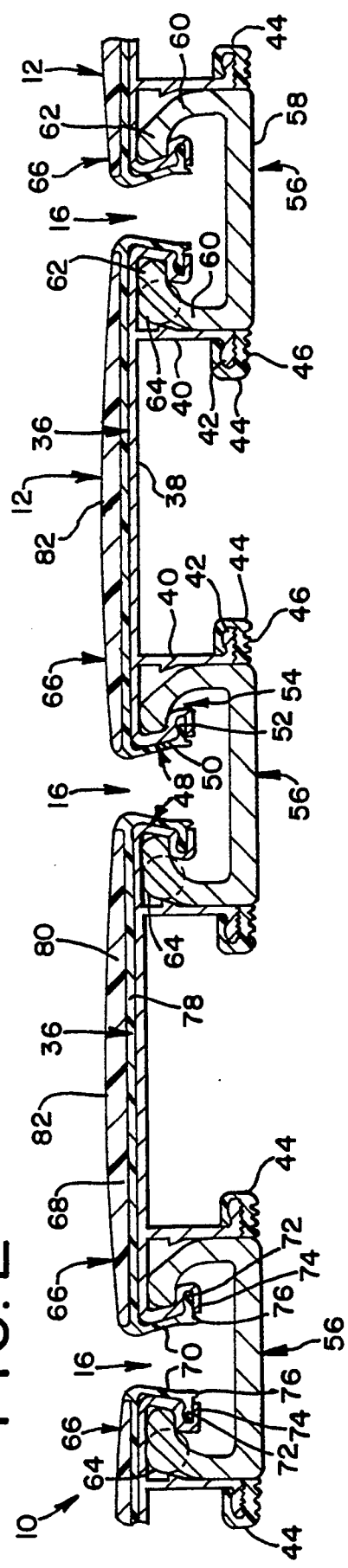
FIG. 2 is a fragmentary enlarged vertical cross section taken through the floor system, generally along the line 2—2 in FIG. 1.

As just indicated, FIGS. 1 and 2 of the drawings illustrate a spaced-plank floor system 10 for supporting domestic animals in an animal enclosure (not shown) where the animals are raised in confinement. The floor system 10 comprises a plurality of spaced, parallel, substantially horizontal, longitudinal planks 12 extending over and covering a pit 14 for receiving animal wastes which are washed off the planks 12 through longitudinal spaces or slots 16 therebetween. The illustrated pit 14 has opposite vertical side walls 18 and 20 and a bottom wall 22 which are made of concrete or some other suitable material. The pit 14 is provided with a flushing system (not shown) for flushing the animal wastes out of the pit 14 with an abundance of water. By thus promptly washing away the animal wastes, the floor system 10 and the pit 14 are maintained in a sanitary condition.

The opposite ends of the planks 12 are supported on horizontal ledges or shoulders 24 and 26, constituting the lower walls of channel-shaped recesses 28 and 30 formed in the upper portions of the side walls 18 and 20. The recesses 28 and 30 have vertical walls 32 and 34 which confront and confine the ends of the planks 12. It will be understood that the floor system 10 closes the entire upper end of the pit 14.

As shown in FIG. 1, the planks 12 are supported at one or more intermediate points by one or more piers or other suitable supports 35, extending upwardly in the pit 14. Three such intermediate piers 35 are shown in FIG. 1. In the preferred embodiment, the piers 35 are made of concrete.

As shown in FIGS. 2-5, each of the planks 12 comprises a structural member in the form of an inverted channel 36 made of a corrosion resistant metal, preferably aluminum or an aluminum alloy. Each inverted channel 36 comprises a top wall or deck member 38 having a pair of widely spaced depending structural flanges 40 extending downwardly therefrom to impart rigidity to the channel 36 and to resist vertical deflection of the channel 36 due to the weight of the animals supported on the floor system 10. Each deck member 38 is substantially horizontal, while the depending structural flanges 40 are substantially vertical.

As shown in FIG. 2, the depending structural flanges 40 are formed with in-turned base flanges 42 adapted to be supported by the ledges 24 and 26 and also by the piers 35. In the preferred embodiment, the in-turned flanges 42 are provided with tightly fitting channel-shaped pads 44 having bottom members 46 which are interposed between the base flanges 42 and the ledges 24 and 26, to obviate or reduce noise and abrasion due to slight movements of the base flanges 42 relative to the ledges 24 and 26. Other pads 44 are mounted on the base flanges 42 opposite the piers 35, to obviate or reduce noise and abrasion due to slight movements of the base flanges 42 relative to the piers 35.

Each of the inverted channels 36 comprises a pair of edge channels 48 projecting laterally in opposite directions from the deck member 38 beyond the depending structural flanges 40. Each of the edge channels 48 has a depending leg 50 extending downwardly from the deck member 38 and a lower leg 52 extending laterally inwardly from the depending leg 50 toward the corresponding depending structural flange 40 to afford a longitudinal slot or space 54 between the lower leg 52 and the corresponding structural flange 40.

The floor system 10 also comprises a plurality of generally channel-shaped connectors 56 extending between the planks 12 at longitudinally spaced intervals and interlocking with the edge channels 48 on adjacent pairs of the inverted channels 36 for maintaining a predetermined spacing between the planks 12 and for transmitting vertical loading between the adjacent planks 12. The connectors 56 are made of metal, preferably aluminum or an aluminum alloy.

Each of the connectors 56 is generally in the form of a short U-shaped channel having a generally horizontal member 58 with a pair of upturned flanges 60 formed with in-turned hook members 62 which are slidably received in the edge channels 48 of the adjacent planks 12. Each of the hook members 62 is received with a fairly close sliding fit in the corresponding edge channel. Moreover, each of the upturned flanges 60 is engageable with the adjacent depending structural flange 40, whereby the connectors 56 are effective to transfer vertical loading between the adjacent planks 12.

The channel-shaped connectors 56 tend to slide spontaneously along the edge channels 48 on the planks 12, due to gravitational action when the planks 12 are deflected downwardly to a slight extent by the shifting weight of the animals supported on the planks 12. In accordance with the present invention, such sliding movement of the connectors 56 is prevented by providing a plurality of stop members 64 which are securely mounted on the planks 12 and are engaged with the opposite ends of the connectors 56 to prevent any sliding movement of the connectors 56 along the edge channels 48 of the planks 12. The stop members 64 are made of a soft resilient rubber-like material, such as synthetic rubber or a rubber-like resinous plastic material, such as polyurethane. The stop members 64 are dimensioned so as to be substantially larger in cross sectional width or thickness than the width of the longitudinal slots or spaces 54 between the lower leg 52 of each edge channel 48 and the adjacent depending structural flange 40 of the corresponding inverted channel 36.

During the assembly of the planks 12 and the connectors 56, the stop members 64 are pushed into the longitudinal slots 54 adjacent the ends of the connectors 56. Sufficient pushing force is employed to overcome the interference fit between the stop members 64 and the slots 54. The soft resilient stop members 64 yield resiliently to a sufficient extend to allow the stop members 64 to be pushed into the slots 54, where they fit tightly so as to prevent any longitudinal sliding movement of the connectors 56 along the slots 54. Thus, the connectors 56 are maintained in the desired spaced relation along the length of the adjacent planks 12.

Figure 3:
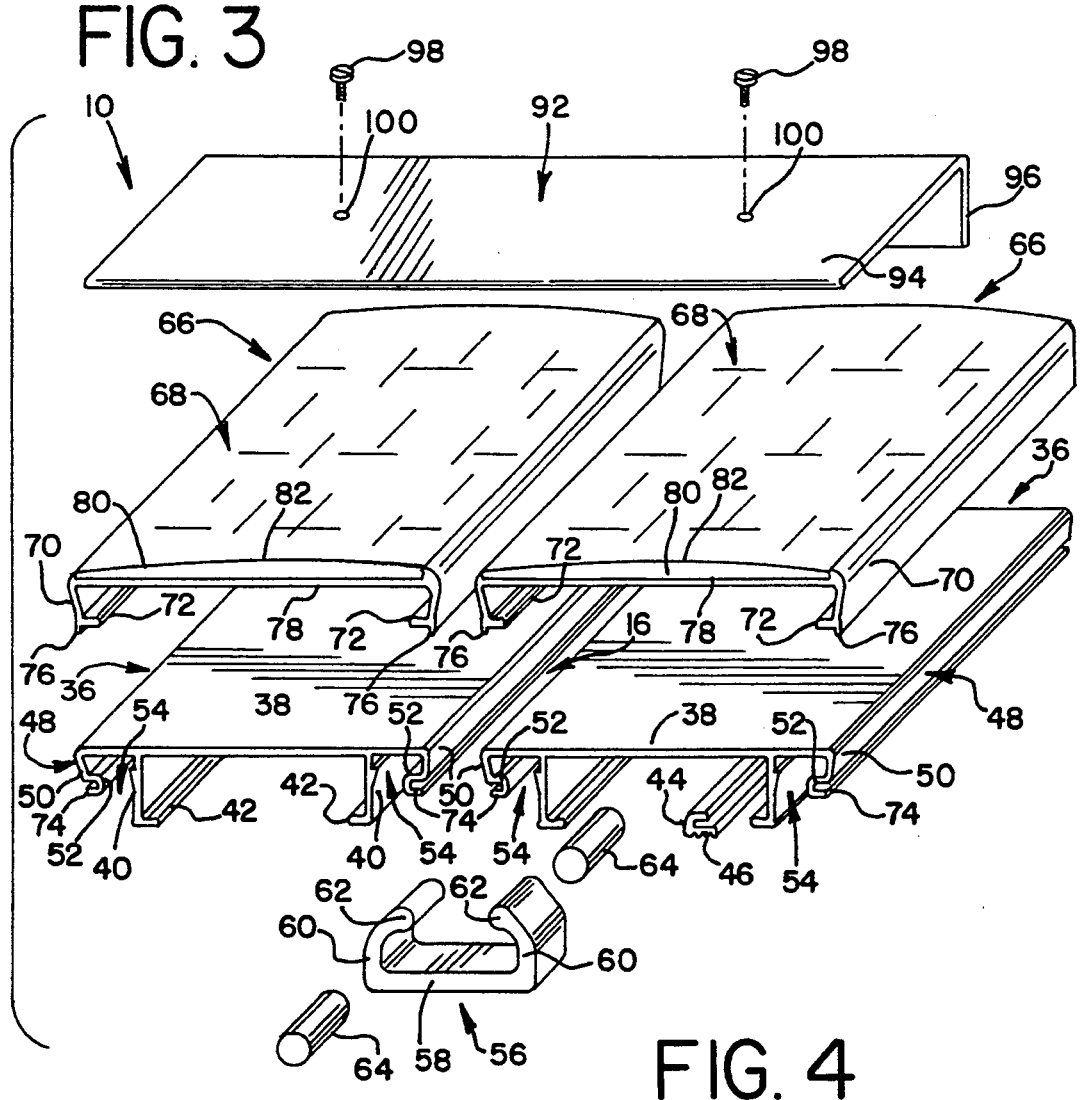
FIG. 3 is a fragmentary enlarged exploded perspective view of the floor system.

In the preferred embodiment, the stop members 64 are cylindrical in shape, as clearly shown in FIGS. 2 and 3. The positioning of the stop members 64 is clearly shown in FIG. 5.

In the illustrated floor system 10, each of the metal inverted channels 36 is provided with a cover member 66 made of a heat insulating, liquid-proof material, such as polyurethane, or some other suitable material, such as a resinous plastic material or synthetic rubber. The heat insulating material feels warm to the animals so that they can lie comfortably on the planks 12 when provided with the cover members 66. Moreover, the cover members 66 are not affected by the liquid or solid animal wastes, or by the water employed to wash the waste materials through the slots 16 between the planks 12. The cover members 66 are not subject to corrosion and are very resistant to abrasion.

Each cover member 66 has a top wall 68 which completely covers the deck member or top wall 38 of the corresponding plank 12. Moreover, each cover member 66 has a pair of depending side walls 70 formed in one piece with the top wall 68 and extending downwardly therefrom for engaging and covering the exposed surfaces of the depending legs 50 of the edge channels 48 on the inverted metal channels 36.

Each of the side walls 70 of the cover member 66 is formed with a lower, generally horizontal flange 72 extending laterally inwardly from the lower edge of the side wall 70 for covering the corresponding lower leg 52 of the corresponding edge channel 48.

Figure 4:
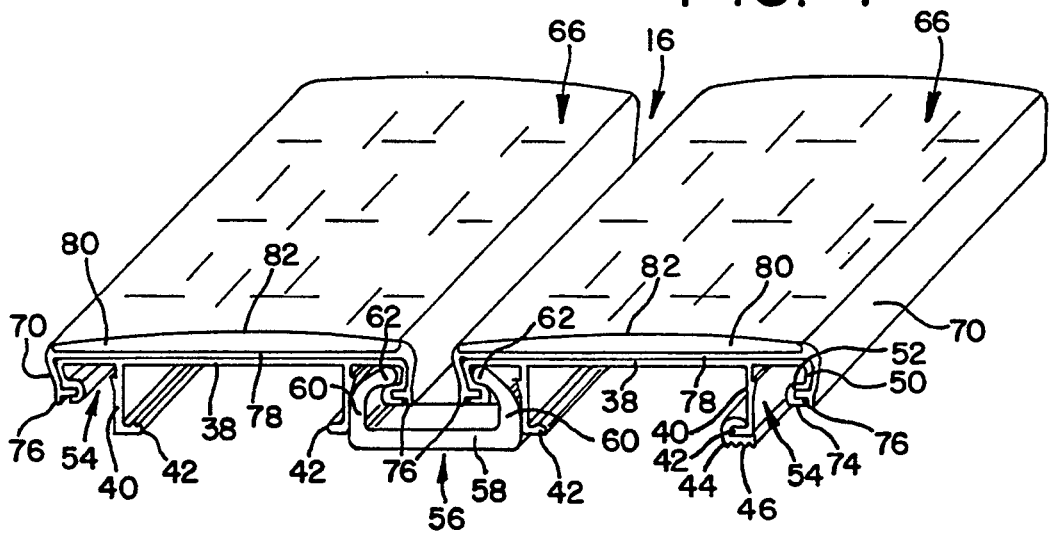
FIG. 4 is a fragmentary perspective view showing two adjacent planks and one of the connectors of the floor system.

Each cover member 66 is attached securely to the corresponding inverted channel 36. In the preferred embodiment, each of the lower legs 52 of the edge channels 48 is provided with clamping means for clamping the corresponding lower flange 72 of the cover member 66 against the corresponding lower leg 52. As illustrated in FIGS. 2-4, such clamping means comprise a bendable alligator jaw flange 74 formed integrally with each of the lower legs 52 for clamping the corresponding lower flange 72 of the cover member 66 against the corresponding lower leg 52. In the assembly of each cover member 66 and the corresponding inverted channel 36, each of the horizontal flanges 72 on the corresponding side wall 70 of the cover member 66 is inserted between the adjacent lower leg 52 and the bendable alligator jaw flange 74, which is then bent upwardly with sufficient force to clamp the corresponding horizontal flange 72 between the alligator jaw flange 74 and the corresponding lower leg 52. In the preferred embodiment, adhesive material is also employed between the metal deck member 38 and the top wall 68 of the corresponding cover member 66.

At the junction between the lower edge of each of the depending side walls 70 and the corresponding lower horizontal flange 72, each cover member 66 is formed with a downwardly projecting longitudinal lip 76, formed in one piece with the corresponding side wall 70 and constituting the lowermost portion thereof, for causing any liquid which flows down the side wall 70 to drip downwardly from the lip rather than flowing around the lip to the corresponding lower flange 72. Thus, each downwardly projecting lip 76 prevents any liquid from coming into engagement with the metal alligator jaw flange 74 on the corresponding lower leg 52. The downwardly projecting longitudinal drip lips 76 constitute the lowermost extremities of the side walls 70 of the cover member 66. The provision of the drip lips 76 obviates or reduces corrosion of the metal inverted channels 36.

As illustrated in FIG. 2, the top wall 68 of the cover member 66 is formed with two laminated layers or members, comprising a lower structural wall member 78 and an upper tread member 80, securely bonded to the structural wall member 78. In the preferred embodiment, the lower and upper layers or members 78 and 80 are formed by coextrusion of the cover member 66 in accordance with well known coextrusion methods. The lower structural wall member 78 of the preferred embodiment comprises a relatively hard, resilient and strong grade of polyvinylchloride, while the upper tread member 80 comprises a relatively soft grade of polyurethane which affords excellent traction and is comfortable for the animals to stand and lie upon, while also deadening noise. Both the lower structural wall member 78 and the upper tread member 80 are liquid-proof, highly resistant to corrosion, and highly resistant to abrasion. The polyurethane is formulated to bond securely to polyvinylchloride when the lower and upper members 78 and 80 are co-extruded. The upper tread member 80 is basically horizontal but has a slight central crown 82 so that liquids will drain off the tread member 80 by gravity.

As shown to best advantage in FIGS. 6–9, the preferred upper tread member 80 is formed with upwardly projecting tread means comprising a plurality of interspersed first and second upwardly projecting ridge elements 84a and 84b. The first ridge elements 84a extend in a predetermined direction and are parallel to one another, while the second ridge elements 84b extend in a second transverse direction, illustrated as being substantially perpendicular to the first direction. The second ridge elements 84b are also parallel to one another. As shown in FIG. 6, the first ridge elements 84a extend longitudinally along each of the planks 12, while the second ridge elements 84b extend transversely. The first and second ridge elements 84a and 84b are arranged alternately along both the length and the width of each of the planks 12.

As shown in FIG. 8, each of the ridge elements 84a and 84b has a cross section substantially in the form of an inverted V. In the preferred embodiment, all of the ridge elements 84a and 84b have the same shape. As shown in FIG. 6, the ridge elements 84a and 84b are formed with pairs of end portions 86a and 86b tapering in width to form points. As shown in FIG. 9, each of the end portions 86a and 86b also tapers in height.

The upwardly projecting ridge elements 84a and 84b afford secure traction for the feet of the animals supported on the planks 12. The length and spacing of the ridge elements 84a and 84b correspond generally with the size of the feet of the smallest animals to be supported on the floor system 10. Thus, for example, if the floor system is to be used for the raising of pigs in confinement, the length and spacing of the ridge elements 84a and 84b corresponds generally to the size of the feet of the smallest baby pigs to be supported on the floor system 10. Consequently, all of the feet will be on or very near one or more of the ridge elements 84a and 84b at all times. The larger feet of mature pigs will be in engagement with two or more of the ridge elements 84a and 84b whenever the feet engage the floor system 10.

FIG. 7 illustrates a modified tread member 88 formed with first and second interspersed ridge elements 90a and 90b which extend diagonally in directions which are mutually perpendicular. Otherwise, the first and second ridge elements 90a and 90b may be substantially similar to the previously described first and second ridge elements 84a and 84b shown in FIG. 6. The construction of FIG. 6 has the advantage that it is easier to extrude than the construction of FIG. 7.

At the opposite ends of the floor system 10, the ends of the spaced horizontal planks 12 are covered by a pair of end trim angle members 92 made of a strong, durable, corrosion resistant and liquid-proof material, preferably a resinous plastic material such as polyurethane or polyvinylchloride. The angle member 92 is preferably formed by extrusion of the plastic material. As shown in FIGS. 1 and 3, each end trim angle member 92 has a horizontal leg or flange 94 and a vertical leg or flange 96. Each of the end trim angle members 92 is mounted on one end of the floor system 10 so that the vertical flange 96 covers the ends of the horizontal planks 12 while the horizontal flange 94 covers the adjacent portions of the horizontal tread members 80 of the planks 12.

Means are provided to secure each of the horizontal flanges 94 to some or all of the planks 12. Such means are illustrated in FIG. 3 as comprising self-drilling and self-tapping screws 98 which are inserted through holes 100, formed in each horizontal flange 94. The screws 98 are power driven so that they will drill their own holes and tap their own threads into the planks 12. In the preferred embodiment, adhesive materials are also employed between each of the horizontal flanges 94 of the end trim angle members 92 and the adjacent upper surface portions of the floor planks 12.

As shown in FIG. 1, the vertical flange 96 of the left-hand end trim angle member 92 extends between the adjacent ends of the planks 12 and the vertical wall 32 of the recess 28 in the concrete side wall 18 of the pit 14. Similarly, the vertical flange 96 of the right-hand end trim angle member 92 extends between the adjacent ends of the planks 12 and the vertical wall 34 of the recess 30 in the concrete side wall 20 of the pit 14. The end trim angle members 92 substantially prevent any liquid from flowing downwardly into contact with the ends of the metal inverted channels 36. The end trim angle members 92 make the floor system 10 easier to clean while largely obviating any deterioration of the ends of the metal inverted channels 36. The end trim angle members 92 also improve the appearance of the floor system 10.

Various other modifications, alternative constructions and equivalents may be employed, without departing from the true spirit and scope of the present invention, as disclosed in the preceding description and as defined in the following claims.

I claim:

1. A spaced-plank floor system for supporting animals in an animal enclosure, said floor system comprising
   a plurality of spaced longitudinal planks extending horizontally in a parallel spaced relation,
   each of said planks including a metal inverted channel comprising a substantially horizontal deck member having a pair of depending structural flanges affording rigidity and resisting vertical bending of the plank,
   said deck member having a pair of edge channels projecting laterally thereon beyond the respective depending flanges,
   each of said edge channels having a depending leg extending downwardly from said deck member and a lower leg extending laterally inwardly from said depending leg toward the corresponding flange to afford a longitudinal slot therebetween,
   a plurality of generally channel-shaped connectors extending between said planks at longitudinally spaced intervals and interlocking with said edge channels on said inverted channels for maintaining a predetermining spacing between said planks and for transferring vertical loading between the adjacent planks,
   each of said connectors being generally in the form of a U-shaped channel having a generally horizontal member with a pair of upturned flanges formed with in-turned hook members for slidable reception in said edge channels of said planks,
   and a plurality of stop members made of a soft resilient rubber-like material,
   said stop members being substantially larger in cross-sectional width than the width of said longitudinal slots but being dimensioned to fit tightly into said slots adjacent the ends of said connectors when pushed into said slots during the assembly of said planks and connectors, whereby said stop members are effective to locate said connectors in spaced positions along said edge channels and said slots against sliding movement therealong.

2. A floor system according to claim 1,
   in which each of said stop members is initially generally cylindrical in shape and is resiliently compressible to fit tightly in said slots adjacent the opposite ends of said connectors.

3. A floor system according to claim 1,
   in which said stop members are made of synthetic rubber.

4. A spaced-plank floor system for supporting and cushioning animals in an animal enclosure, said floor system comprising
   a plurality of spaced longitudinal planks extending horizontally in a parallel spaced relation,
   each of said planks including a metal inverted channel comprising a generally horizontal deck member having a pair of depending structural flanges affording rigidity and resisting vertical deflection of the plank,
   said deck member having a pair of edge channels projecting laterally thereon beyond the respective depending structural flanges,
   each of said edge channels having a depending leg extending downwardly from said deck member and a lower leg extending laterally inwardly from said depending leg toward the corresponding flange to afford a longitudinal slot therebetween,
   a cushioning cover member made of a heat insulating material and covering said deck member,
   said deck member having an upper surface,
   said cover member having a top wall for covering said upper surface of said deck member,
   said cover member having a pair of side walls depending from said top wall for enclosing the depending legs of said edge channels,
   each of said side walls having a lower edge and a lower generally horizontal flange extending laterally inwardly from said lower edge for covering the corresponding lower leg on the corresponding edge channel of said inverted channel,
   each of said lower legs having clamping means for clamping the corresponding lower flange of said cover member against the corresponding lower leg,
   each of said lower edges of said side walls having a downwardly projecting longitudinal lip thereon for causing any liquid which flows down said side wall to drip downwardly from said lip rather than flowing around said lip to the corresponding lower flange.

5. A floor system according to claim 4,
   said clamping means comprising a pair of bendable alligator jaw flanges formed integrally with said lower legs of said edge channels for clamping said lower flanges of said cover member against the corresponding lower legs, whereby said cover member is securely mounted on said inverted channel.

6. A floor system according to claim 4,
   in which said cushioning cover member is made of flexible resilient resinous plastic material.

7. A floor system according to claim 4,
   in which said cushioning cover member comprises a lower structural member made of a relatively hard flexible resilient polyvinylchloride material,
   said cover member also comprising an upper tread member securely laminated to said lower structural member and made of a relatively soft flexible resilient polyurethane material.

8. A spaced-plank floor system for supporting animals in an animal enclosure, said floor system comprising
   a plurality of spaced longitudinal planks extending horizontally in a parallel spaced relation,
   each of said planks including a metal inverted channel comprising a generally horizontal deck member having a pair of depending structural flanges affording rigidity and resisting vertical deflection of the plank,
   said deck member having a pair of edge channels projecting laterally therefrom beyond the respective depending structural flanges,
   each of said edge channels having a depending leg extending downwardly from said deck member and a lower leg extending laterally inwardly from said depending leg toward the corresponding structural flange to afford a longitudinal slot therebetween,
   a cushioning cover member made of a heat insulating material and covering said deck member,
   said deck member having an upper surface,
   said cover member having a top wall for covering said upper surface of said deck member,
   said cover member having a pair of side walls depending from said top wall for enclosing the depending legs of said edge channels,
   each of said side walls having a lower edge and a lower generally horizontal flange extending laterally inwardly from said lower edge for covering the corresponding lower leg of the corresponding edge channel of said inverted channel, each of said lower legs having clamping means for clamping the corresponding lower flange of said cover member against the corresponding lower leg, said top wall of each of said cover members having a cushioning tread member thereon, said tread member having a soft resilient rubber-like upper load-supporting portion with upwardly projecting tread means thereon, said tread means comprising a plurality of interspersed first and second upwardly projecting ridge elements thereon, said first ridge elements extending in a predetermined direction while said second ridge elements extend in a second direction transverse to said first direction, each of said ridge elements having a cross section substantially in the form of an inverted V, each of said ridge elements having end portions tapering in width to form a point and also tapering in height, said ridge elements affording secure traction for the feet of animals supported on the tread members.

9. A floor system according to claim 8,
in which said tread member is bonded securely to said top wall of said cover member.

10. A floor system according to claim 9,
in which said cover member is made of a relatively hard grade of polyvinylchloride,
said tread member being made of a relatively soft compressible grade of polyurethane.

11. A floor system according to claim 8,
in which said cover member is made of relatively hard flexible resilient polyvinylchloride,
said tread member being made of relatively soft compressible polyurethane affording good traction and cushioning comfort for the animals.

* * * * *